United States Patent
Ahuja et al.

(10) Patent No.: US 9,910,647 B2
(45) Date of Patent: Mar. 6, 2018

(54) FIELD SIZE CALCULATION AND COLOR CODING DISPLAY OPTIONS USABLE IN AN EMULATED INTEGRATED DEVELOPMENT ENVIRONMENT (IDE)

(71) Applicants: Gaurav Ahuja, Bangalore (IN); Anand Prakash, Bangalore (IN); Swetha Shetty, Bangalore (IN)

(72) Inventors: Gaurav Ahuja, Bangalore (IN); Anand Prakash, Bangalore (IN); Swetha Shetty, Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 202 days.

(21) Appl. No.: 14/667,851

(22) Filed: Mar. 25, 2015

(65) Prior Publication Data

US 2016/0239277 A1    Aug. 18, 2016

(51) Int. Cl.
*G06F 9/44* (2006.01)
*G06F 9/45* (2006.01)

(52) U.S. Cl.
CPC .............. *G06F 8/436* (2013.01); *G06F 8/20* (2013.01); *G06F 8/33* (2013.01)

(58) Field of Classification Search
None
See application file for complete search history.

(56) References Cited

U.S. PATENT DOCUMENTS 6,792,595 B1 * 9/2004 Storistenau ............... G06F 8/33
345/650

* cited by examiner

*Primary Examiner* — Chuck Kendall (57) ABSTRACT

A method and apparatus for allowing for field size calculation and color coding display options usable in an emulated integrated development environment (IDE). A user may be able to quickly and accurately calculate the field size of variables in a code structure, irrespective of the length of the structure or the number of variables selected. The user may also be able to match the variables with their redefinitions accurately and easily when required. A user may also be able to easily identify the names of sections, paragraphs, referenced variables, and unreferenced variables visually in a code editor. The users may also be able to assign colors of his choice to the sections, paragraphs, referenced variables, and unreferenced variables.

24 Claims, 6 Drawing Sheets

FIELD SIZE CALCULATION AND COLOR CODING DISPLAY OPTIONS USABLE IN AN EMULATED INTEGRATED DEVELOPMENT ENVIRONMENT (IDE)

FIELD OF THE DISCLOSURE

The instant disclosure relates to computer systems. More specifically, this disclosure relates to field size calculation and color coding display options useable in a code editor in an emulated integrated development environment (IDE).

BACKGROUND

In conventional emulated environments, such as OS 2200 or other suitable environments, a user/developer may view and edit data files and elements in program files using a variety of editors provided by one or more hosts. In some instances, the user has to calculate a memory field size that program variables would occupy during the program's execution. This may become tedious if done manually due to large variable sizes and redefinitions. Further, it becomes more difficult and erroneous to calculate the size of group variables and determine if a variable-size matches the size of its redefinition. Additionally, when editing code, if the user keys in the name of a variable, section, or paragraph, there is no visual clue for whether that name is correct. The only way for a user to verify the name is to search for that variable in the Data Division of the program code. This can be frustrating at times, especially for programs with large number of variables. Similarly, the only way to locate unreferenced variables in the code is to search all the variables, one at a time, in the Procedure Division of the program. There is no visual clue enabling the user to identify unreferenced variables declared in the Data Division of the program code. Thus, there is a desire to provide functionality in an emulated IDE that would enable a user to quickly and efficiently determine the field size and display element names in a code editor.

SUMMARY

A system allowing for field size calculation and color coding display options usable within an IDE is provided. In some embodiments, a method of analyzing code within an integrated development environment comprises receiving a plurality of field size rules for automatically calculating a field size for a code structure; receiving a plurality of element display rules for categorizing one or more elements in a code structure; and displaying results based on the field size rules and the element display rules.

In some embodiments, the method further comprises receiving a selection of one or more program variables; analyzing the selection for completeness; completing an incomplete selection; creating lookups for the one or more program variables; and calculating field size offsets for the one or more program variables. In some embodiments, the method further comprises determining a redefinition of the one or more program variables; calculating a field size offset for the redefinition; and matching the field size offset for the redefinition with the one or more program variables.

In some embodiments, the method further comprises modifying the selection of one or more program variables; and refreshing a calculation of the field size offsets for the one or more program variables. In some embodiments, the method further comprises analyzing the one or more elements; categorizing the one or more elements into one or more categories; creating a plurality of lists corresponding to the one or more categories; and assigning an element display rule for each of the plurality of lists. In some embodiments, the element display rules are color coding rules and font coding rules. In some embodiments, the method further comprises modifying an element display rule; and refreshing display results based on the modified element display rule.

According to another embodiment, a computer program product may include a non-transitory computer-readable medium comprising code to perform the steps of analyzing code within an integrated development environment comprises receiving a plurality of field size rules for automatically calculating a field size for a code structure; receiving a plurality of element display rules for categorizing one or more elements in a code structure; and displaying results based on the field size rules and the element display rules.

In some embodiments, the medium may also comprise code to perform the steps of receiving a selection of one or more program variables; analyzing the selection for completeness; completing an incomplete selection; creating lookups for the one or more program variables; and calculating field size offsets for the one or more program variables. In some embodiments, the medium may also comprise code to perform the steps of determining a redefinition of the one or more program variables; calculating a field size offset for the redefinition; and matching the field size offset for the redefinition with the one or more program variables.

In some embodiments, the medium may also comprise code to perform the steps of modifying the selection of one or more program variables; and refreshing a calculation of the field size offsets for the one or more program variables, in some embodiments, the medium may also comprise code to perform the steps of analyzing the one or more elements; categorizing the one or more elements into one or more categories; creating a plurality of lists corresponding to the one or more categories; and assigning an element display rule for each of the plurality of lists. In some embodiments, the medium may also comprise code to perform the steps of modifying an element display rule; and refreshing display results based on the modified element display rule.

According to yet another embodiment, an apparatus may include a storage device, a memory, and a processor coupled to the memory and storage device. The processor may be configured to execute the steps of analyzing code within an integrated development environment comprises receiving a plurality of field size rules for automatically calculating a field size for a code structure; receiving a plurality of element display rules for categorizing one or more elements in a code structure; and displaying results based on the field size rules and the element display rules.

In some embodiments, the processor may be further configured to execute the steps of receiving a selection of one or more program variables; analyzing the selection for completeness; completing an incomplete selection; creating lookups for the one or more program variables; and calculating field size offsets for the one or more program variables. In some embodiments, the processor may be further configured to execute the steps of determining a redefinition of the one or more program variables; calculating a field size offset for the redefinition; and matching the field size offset for the redefinition with the one or more program variables.

In some embodiments, the processor may be further configured to execute the steps of modifying the selection of one or more program variables; and refreshing a calculation of the field size offsets for the one or more program variables. In some embodiments, the processor may be further configured to execute the steps of analyzing the one or more elements; categorizing the one or more elements into one or more categories; creating a plurality of lists corresponding to the one or more categories; and assigning an element display rule for each of the plurality of lists. In some embodiments, the processor may be further configured to execute the steps of modifying an element display rule; and refreshing display results based on the modified element display rule.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
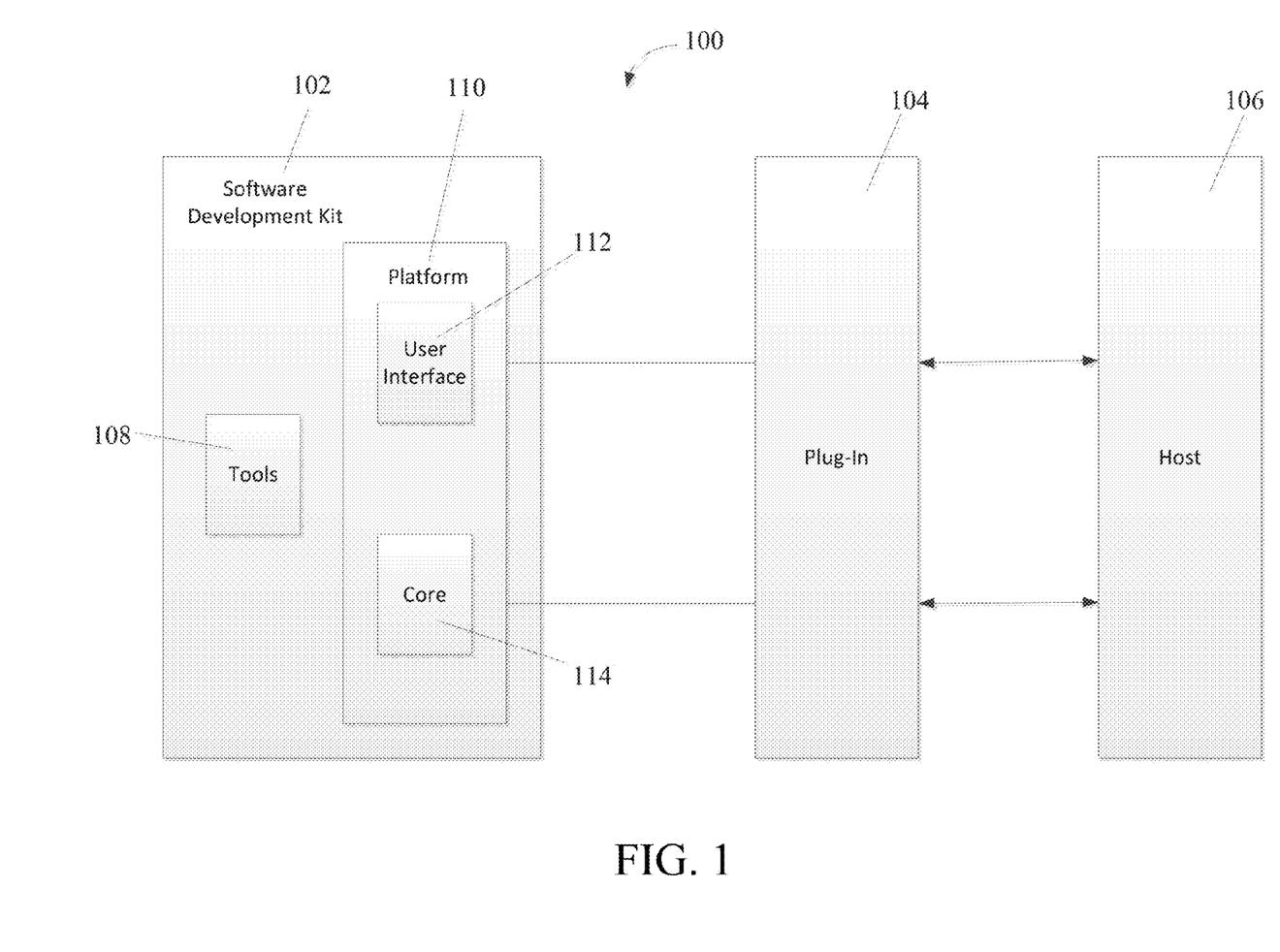
FIG. 1 is a block diagram illustrating an IDE architecture according to one embodiment of the disclosure.

FIG. 1 illustrates one embodiment of an emulated IDE architecture 100 according to one embodiment of the disclosure. The architecture of IDE 100 may include a software development kit (SDK) 102, one or more plug-ins/modules 104, and one or more hosts/mainframes 106. SDK 102 may include various software development tools 108 that allow a user to create software applications, SDK 102 may also include a platform 110 that may include a user interface 112 and a core 114. A user may use user interface 112 to access tools 108 and plug-ins 104 that support a variety of different programming options. Plug-ins 104 may be open source and may provide additional functionalities in a variety of categories, including application management, build and deploy, graphics, profiling, and testing. Plug-ins 104 may also provide access to transactions and databases in one or more hosts 106. Platform 110 may enable development in many different programming languages, such as, for example, Java, COBOL, and PLUS. Platform 110 may also enable the use of various network protocols, such as, for example, TelNet.

A user may download SDK 102 and access platform 110 on a suitable processor-based device such as a desktop computer, a laptop computer, a personal digital assistant (PDA) or tablet computer, a smartphone or other mobile communication device. In some embodiments, the processor-based device may access a network to access a web application or web service hosted by mainframes 106 and enable the user to enter or receive information via user interface 110. The network 108 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

The applications of the present disclosure are not limited to IDE architecture 100 or any particular type of computer system. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (AMC), very large scale integrated (VLSI) circuits, or other circuitry. In fact, persons of ordinary skill in the art may utilize any number of suitable structures capable of executing logical operations according to the described embodiments. For example, a computer system may be virtualized for access by multiple users and/or applications.

Figure 2:
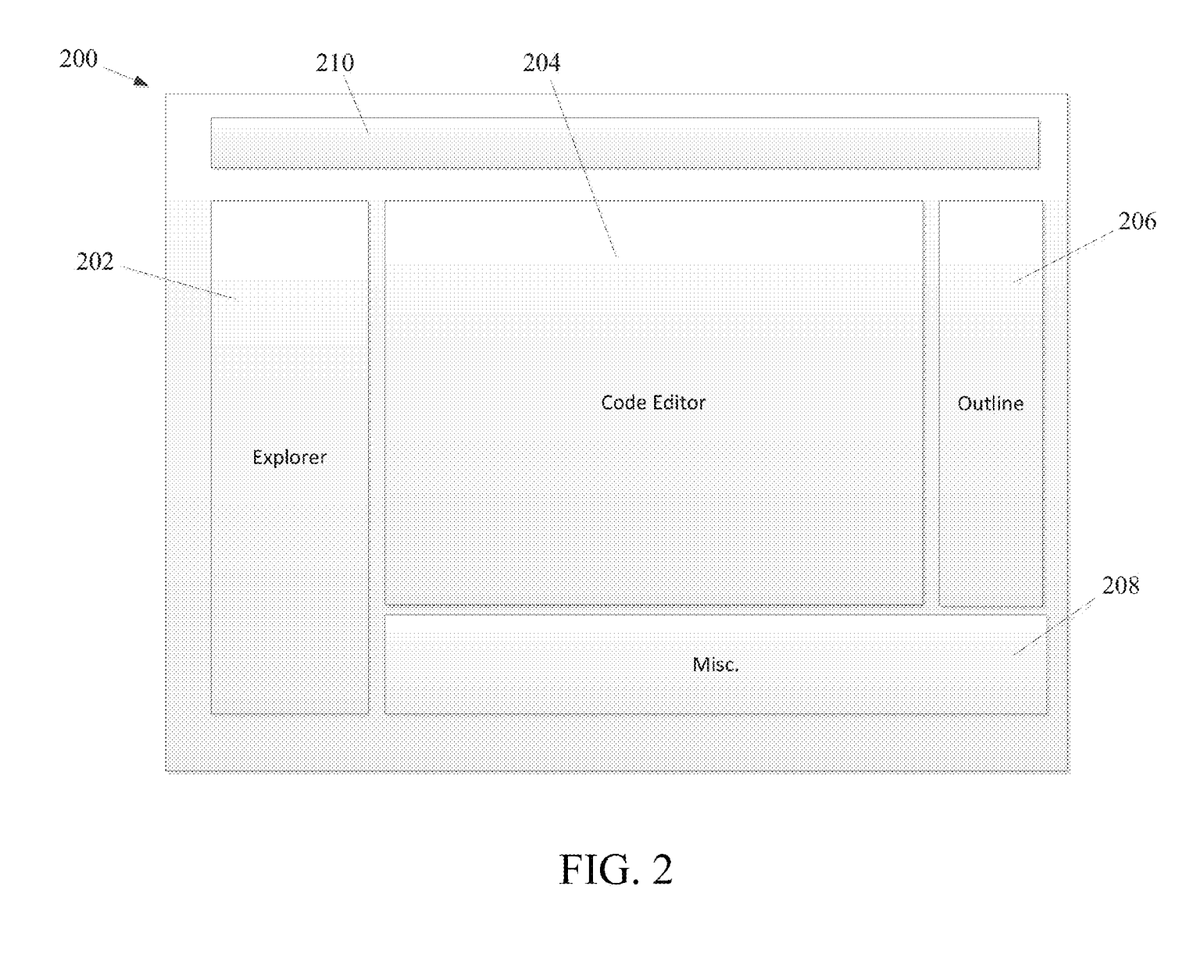
FIG. 2 is a diagram illustrating an example of a IDE user interface according to one embodiment of the disclosure.

FIG. 2 illustrates an example of a perspective 200 of IDE user interface 112 according to one embodiment of the disclosure. Perspective 200 may comprise a view that allows the user to perform different development tasks. One or more windows 202, 204, 206, 208 may be provided, in various arrangements, to separate and organize various activities. These activities may comprise, for example, code editing, error checking, debugging, and searching. In the embodiment shown, perspective 200 comprises an explorer window 202, a code editor window 204, an outline window 206, and a miscellaneous or catch-all window 208. Windows 202, 204, 206, 208 may be linked together such that an action performed in one window may have an effect in one or more of the other windows. Each window may have minimize and full-screen buttons to allow the user to minimize the window or expand the window to a full-screen view, respectively. Perspective 200 may also comprise one or more menu bars or icons 210 to enable a user to perform various user interface functionalities.

In some embodiments, explorer window 202 may enable the user to view a structured view of a project and its objects. A project may comprise one or more application source files, a mechanism to edit the files, and a workfile that contains currently worked-on objects and pieces, such all or portions of application source code. Each project and object may be represented by icons in a hierarchical structure to allow the user to navigate to a particular project and object by selecting a corresponding icon.

In some embodiments, code editor window 204 may enable the user to view and edit a particular section of code. Code editor window 204 may include a tab selection area at the top of the window. The user may open multiple sections of code that are represented by tabs. The user may select a tab to work on a particular section of code and may move to other sections by toggling the tabs. The user may add and delete code in the editor window and save any changes.

In some embodiments, outline window 206 may enable the user to view a structured view of the file being currently edited. Major sections of code within the file may be represented by icons in a hierarchical structure to allow the user to navigate to a particular section of code within the file by selecting a corresponding icon. This functionality allows for quick navigation to key sections of code that may need multiple edits.

In some embodiments, catch-all window 208 may enable the user to view miscellaneous activities and notifications. Examples of activities include tasks, problems, properties, bookmarks, and errors. Catch-all window 208 may include a tab selection area at the top of the window having tabs that represent various tasks. The user may select a tab to work on a particular task. Due to linking between the windows, a selection made in catch-all window 208 may effect changes in one or more other windows. For example, the user may select a tab in catch-all window 208 to access an error log. If the user clicks on a particular error, code editor window 204 may display the line of code containing the problem so the user can make edits.

Figure 3:
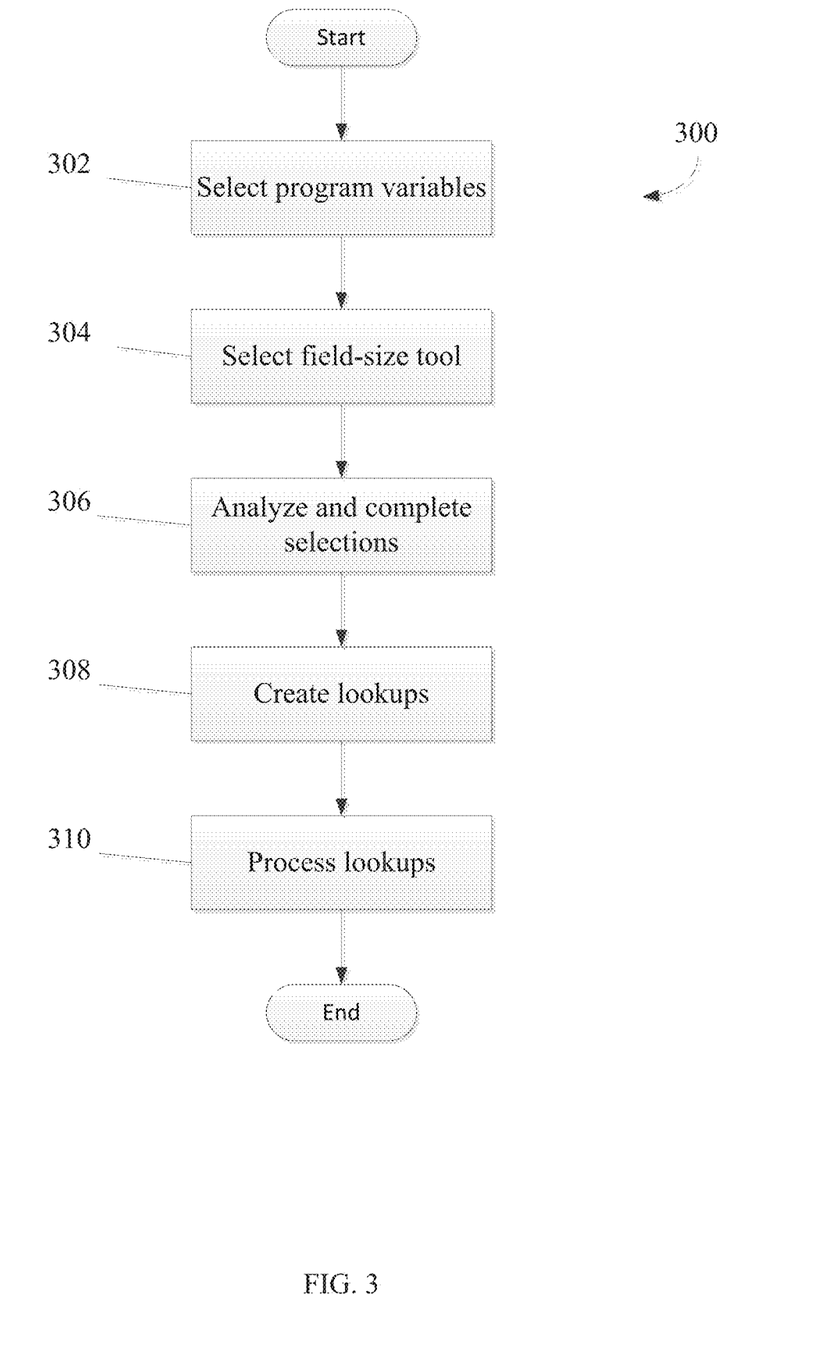
FIG. 3 is a flow chart illustrating a method of calculating the size of selected variables in a COBOL structure according to one embodiment of the disclosure.

FIG. 3 is a flow chart illustrating a method of calculating the size of selected variables in a COBOL structure according to one embodiment of the disclosure. In certain embodiments, the variables for COBOL programs are defined in a. Data. Division code section. A typical COBOL program may have numerous variable definitions. These variables may consist of both individual variables and group variables. Oftentimes, a user has a need to determine the field sizes of one or more of these variables. In certain embodiments, the user may open a section of COBOL code in code editor window 204 to perform field size calculation for one or more variables.

In some sections of COBOL code, a first set of variables may redefine a second set of variables. In such a case, both the first set and second set of variable occupy the same allocations in memory over the system. A user may need to calculate the variable sizes of the first and second sets to determine whether variable sizes in the redefined first set match the variable sizes in the second set.

In the embodiment shown, the method 300 may include, at block 302, selecting one or more variables in a section of COBOL code for field-size calculation. In some embodiments, the user may select one or more variables by clicking on the variables with a mouse pointer in code editor window 204. In some embodiments, the system may process only those variables that have been selected by the user. If no variables are selected, a row containing a cursor may be considered for processing. The selection received from this step may be called the original selection.

At block 304, the method 300 may include selecting a field-size calculation tool. In some embodiments, after selecting one or more variables, the user may trigger a field-size calculation option in the IDE. In the embodiment shown, this option may be triggered by selecting one or more menu bars or icons 210 provided in user interface 112.

At block 306, the method 300 may include analyzing and completing the selections. In some embodiments, the IDE may expect each variable listed in a COBOL program to contain both a level number and a picture clause in its variable definition. The level number may denote a hierarchical data level of that variable while the picture clause may specify how many characters or digits the variable may occupy in memory. In some embodiments, if the original selection does not contain both level numbers and picture clauses for each selected variable, the system will automatically complete the selection. Additionally, if a group variable is selected, the system may automatically select all individual variables within that group.

In some embodiments, the system parses the variable definitions in the original selection to determine whether the selection is complete. For example, in order for the original selection to be deemed complete, a start-line and an end-line of the original selection are considered. The start-line may be the code line of the first variable selected and the end-line may be the code line of the last variable selected. The start-line may be considered complete if it contains a level number of the variable selected. If the level number is missing from the start-line of the original selection, the program document may be parsed backwards from the start-line until the level number for the start-line is found. The code line containing the level number may then be considered the new start-line and will denote the beginning of the selection.

Similarly, the end-line may be considered complete if it contains both a level number and picture clause. If the picture clause is missing from the end-line of the original selection, the program document may be parsed forwards from the end-line until the picture clause for the end-line is found. A selection of a group variable may present a special case because a group variable does not contain a picture clause. If a group variable is selected, the subsequent individual variable definitions may be analyzed until a level number that is less than or equal to the level number of the selected group variable is found. The last analyzed code line containing a picture clause may be considered the new end-line and will denote the end of the selection. The complete selection may be determined based on the new start-line and end-line.

The method 300, at block 308, may create lookups for the selection. In some embodiments, lookups may be created for each of the variables in the complete selection. The picture clause for each individual variable in the complete selection may be converted to lookup format to ensure that all the variables are in the same format. As discussed above, group variables have no picture clause. For group variables, the lookup may contain a domain of the group variable. In some embodiments, the domain of the group variable is determined by the start-line of the group variable and the end line marked by its last individual variable.

The method 300, at block 310, may process the variable lookups and construct offsets. In some embodiments, the variable lookups for the complete selection are processed sequentially. In some embodiments, the offset for each variable may contain the starting position and the size of each variable. In some embodiments, the relative position for the first variable in the complete selection may begin at zero (0). If a group variable is encountered during the sequential processing, its lookup may be skipped. When all its individual variables are processed, the offset for the group variable may be constructed based on the combined offsets of the individual variables.

In some embodiments, the offset results may be displayed to the user in a read-only text box in tabular format. A user may select the unit, i.e., bits, bytes or words, of the offset display results. In some embodiments, the user may select the desired unit from a drop-down menu in user interface 112. The default unit may be bytes while the drop-down menu may display other unit options. If the user changes the unit, the offset results may be modified and displayed in the changed unit.

In some embodiments, the user may view the complete selection of code simultaneously with the offset results. The code selection and the offset results may be displayed in different windows of perspective 200 of user interface 112. Alternatively, the code selection and the offset results may be displayed as separate tabs within the same window. In some embodiments, the user may be able to edit or modify the complete code selection. A user may make a selection to process the modifications and display updated offset results. In some embodiments, offset results may be updated with the user selects a "Refresh" button in user interface 112.

In some embodiments, the same processing may be used to match the sizes of a variable and its redefinition. A user may select a variable that is later redefined by another variable. At the conclusion of method 300, the offset results of the original variable and the redefined variable may be displayed. In some cases, the original variable may be a group variable with thousands of individual variables and redefined variables. If a user selects the original group variable, all of the other thousands of variables may be automatically selected, their offset results tabulated, and displayed in a concise, easily viewable format. In some embodiments, the processing time for the field size calculation is minimal, e.g., 0-1 seconds. Therefore, method 300 may enable a user to calculate the field size of large variable structures quickly and efficiently.

Figure 4:
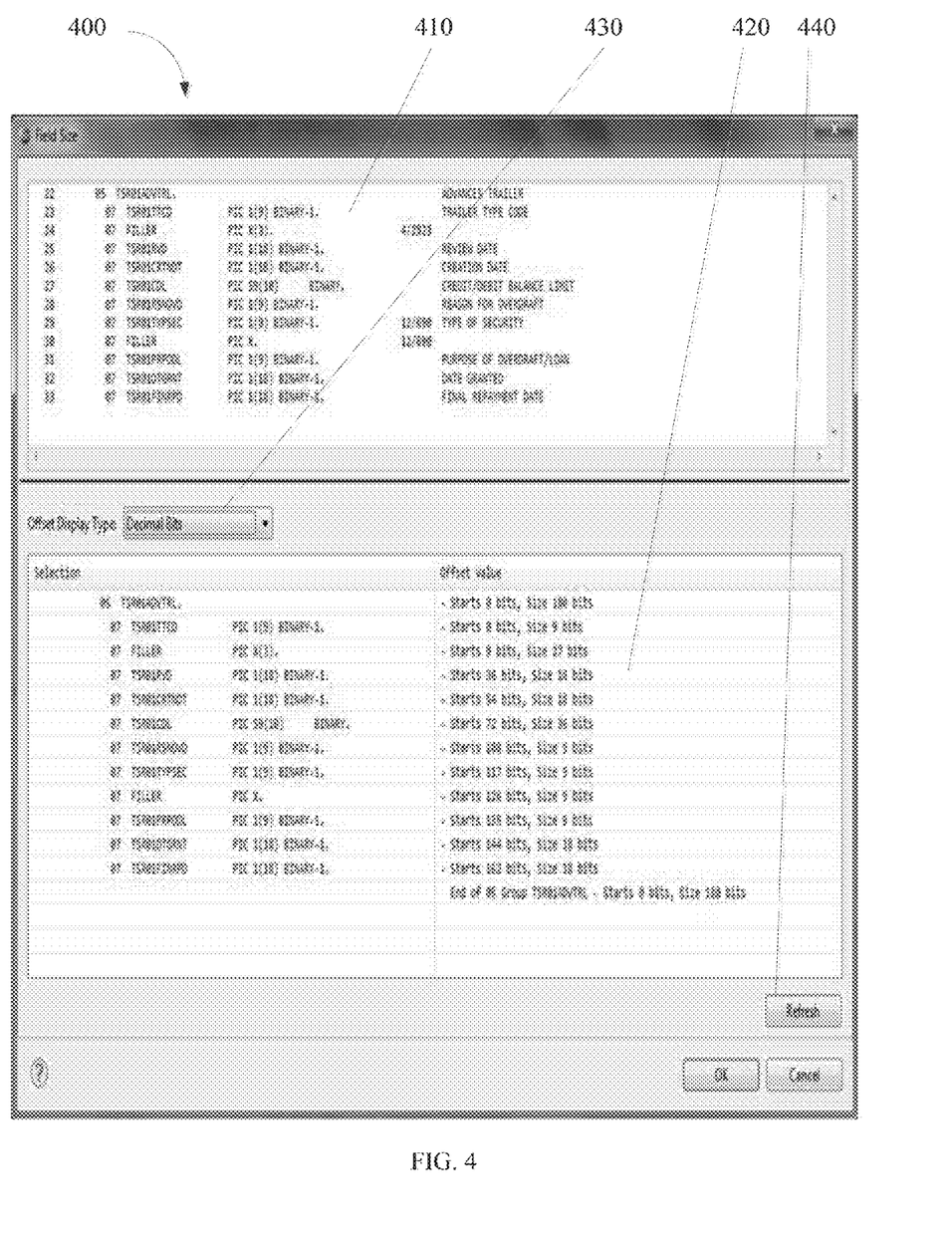
FIG. 4 is a diagram illustrating an example of a field size display according to one embodiment of the disclosure.

FIG. 4 is a diagram illustrating an example of a field size display according to one embodiment of the disclosure. Field size display 400 may include variable structure display window 410, offset display window 420, offset display unit selection 430, and Refresh button 440. Field size display 400 may be provided as part of user interface 112. In some embodiments, field size display 400 may be provided as part of perspective 200. Alternatively, field size display 400 may be displayed in a separate window upon a user selection of the field-size calculation tool in step 304.

Variable structure display window 410 may display the variables comprising an original selection. Offset display window 420 may display the offset results of the variables displayed in variable structure display window 410. The units of the displayed offset results may be changed automatically by a user selecting an entry from offset display unit selection 430, in some embodiments, a user may edit the code listed in variable structure display window 410. In such cases, the user may refresh the offset results displayed in offset display window 420 by selecting Refresh button 440.

Figure 5:
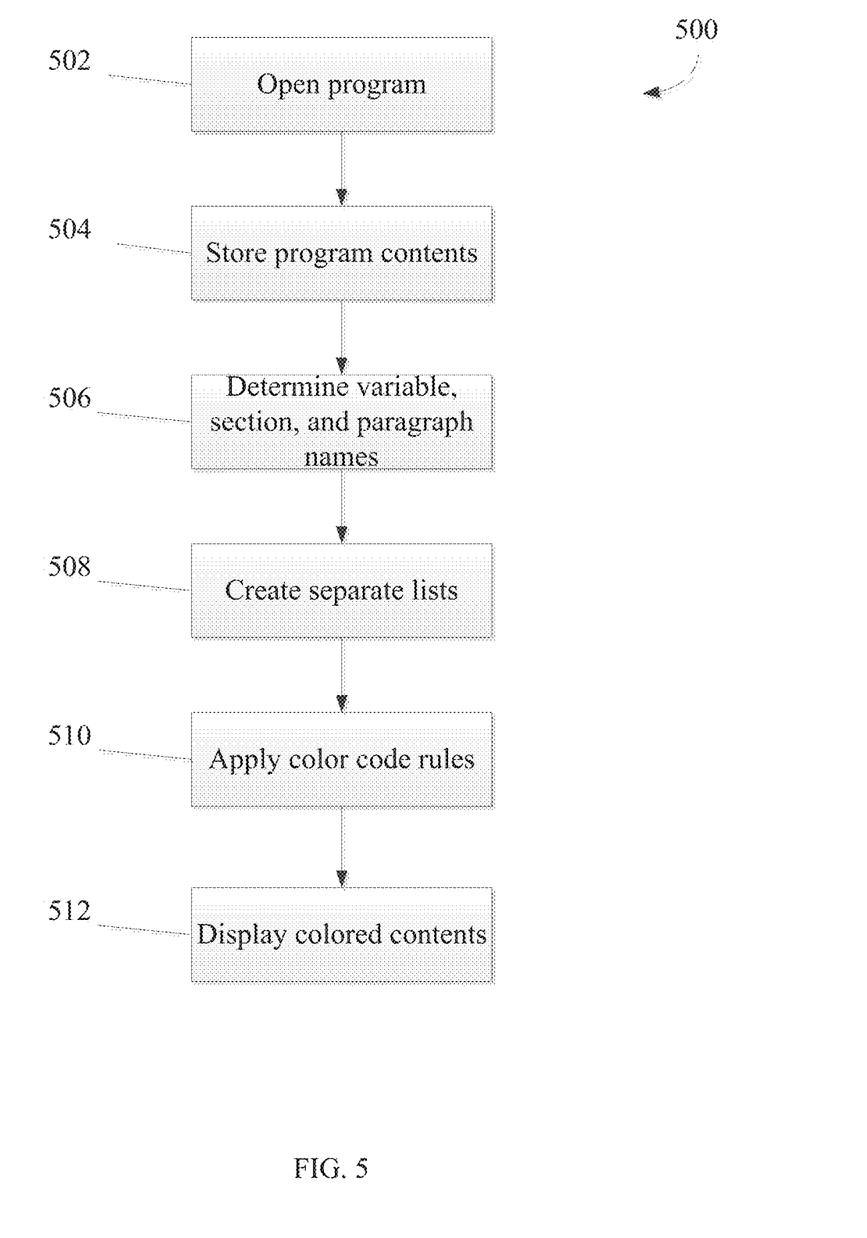
FIG. 5 is a flow chart illustrating a method of color coding terms in a COBOL structure according to one embodiment of the disclosure.

FIG. 5 is a flow chart illustrating a method of color coding terms in a COBOL structure according to one embodiment of the disclosure. In certain embodiments, the variables used in a COBOL program are defined in a Data Division section and the logic for the program is written in paragraphs defined within sections in a Procedure Division section. In some situations, a variable may not be defined in the Data Division of a COBOL program and may not be referenced in any executable line of the Procedure Division. This type of variable may be called an unreferenced variable. The user may define a large number of variables for a program but may not use all of them in the logic of the program. However, all the variables may occupy memory when the program is executed, irrespective of whether the variables have been referenced in the program's logic. Method 500 may enable a user to view visual clues to assist him in editing the variables and logic within a program.

The method 500, at block 502, may initiate the opening of a COBOL program. In some embodiments, a user may interact with user interface 112 to open a desired program. In some embodiments, a user may double-click over an element to open that element in code editor window 204. The element may be validated for its existence and accessibility in the IDE. At block 504, method 500 may include storing the element contents. In some embodiments, once validated for existence and accessibility, the program contents may be read into local memory.

At block 506, the method 500 may parse the contents of the opened program. In some embodiments, the contents stored in the local memory are parsed to determine variable names, paragraph names, and section names. Certain rules may be used in the parsing step to categorize the contents. For example, variable names in COBOL may be located in the Data Division and before the Procedure Division. Variable names may also start with a level number in a certain range (e.g., 01-49) and end with a period. Both paragraph names and section names may start in Area-A (i.e. from $8^{th}$ to $11^{th}$ columns), be comprised only of letters, numbers, and hyphens, and end with a period. However, section names may also be denoted by the keyword. "SECTION." Once categorized, the variable names may searched for in the Procedure Division. If certain parsed variable names are not found in the Procedure Division, they may be further categorized as unreferenced variables.

At block 508, the method 500 may separate the names of the various categories and create separate lists. For example, there may be separate lists for referenced variables, unreferenced variables, section names, and paragraph names, respectively. At block 510, method 500 may apply color coding rules. In some embodiments, color coding rules may be defined for a code editor render the code entities in different colors and fonts. For example, section names, paragraph names, and variable names may defined as separate colors so the user may identify them easily. Unreferenced and referenced variables may be rendered in the same color but unreferenced variable may be further rendered in a Bold font. At block 512, method 500 may display the colored contents in the code editor. In the embodiment shown, the user may view the colored contents in code editor window 204. The contents of the opened COBOL program may be visible to the user with the sections, paragraphs, and variables displayed in their respective colors while unreferenced variables may be displayed in Bold font. In some embodiments, section, paragraph, or variable that are entered incorrectly may be listed in a default color and font (e.g., unbolded black). The default color may suggest to the user that the entity has not been correctly defined in the program.

Figure 6:
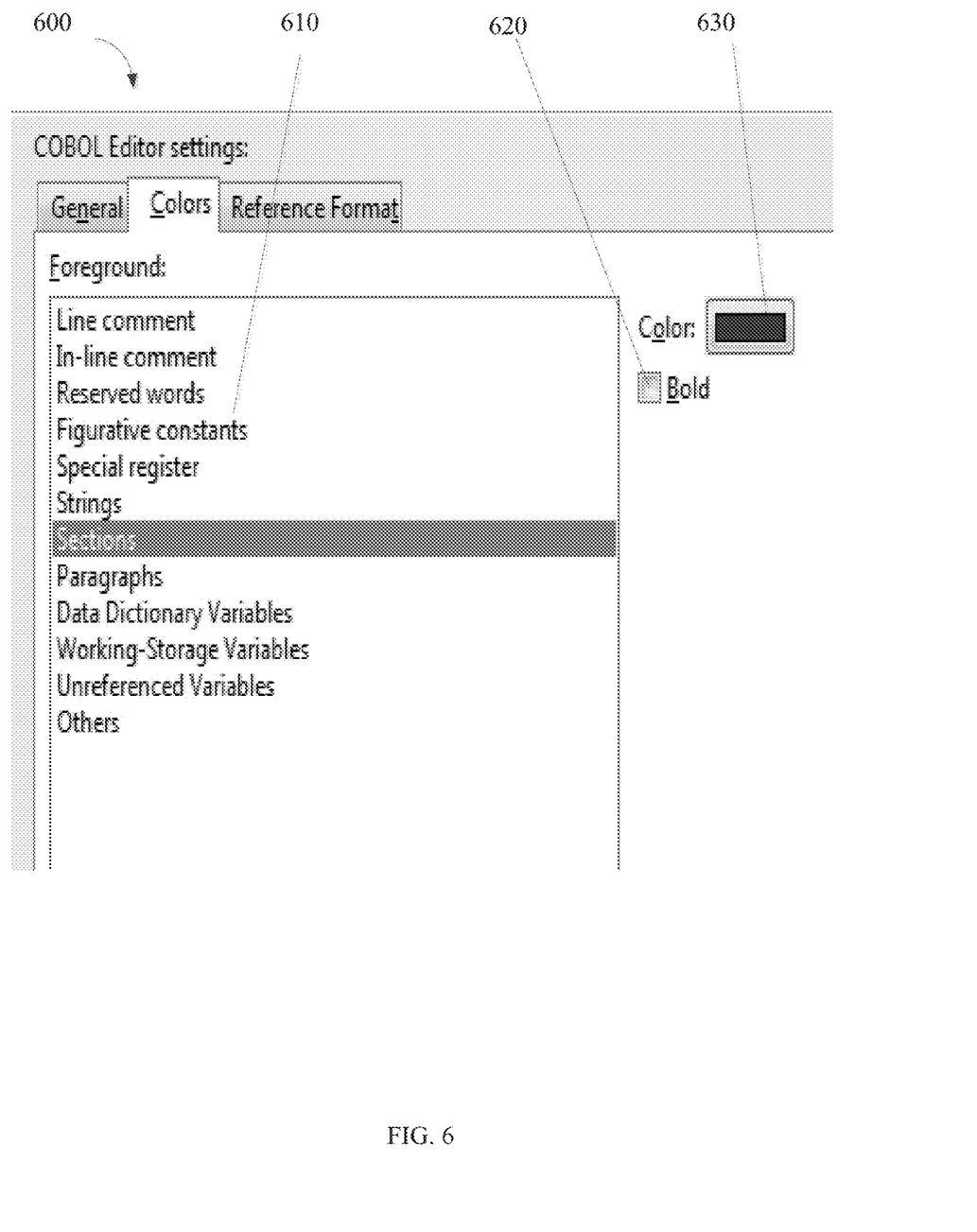
FIG. 6 is a diagram illustrating an example of a color coding options menu according to one embodiment of the disclosure.

FIG. 6 is a diagram illustrating an example of a color coding options menu according to one embodiment of the disclosure. Editor selection display 600 may include a list of coding categories 610. Bold font selection box 620, and color selection box 630. Editor selection display 600 may be provided as part of user interface 112. In some embodiments, editor selection display 600 may be provided as part of perspective 200. Alternatively, editor selection display 600 may be displayed in a separate window upon a user selection of an editor settings menu option.

The user may access editor selection display 600 to define the color coding rules. In the embodiment shown, a user may select a category option from list 610. The selected category may be highlighted. The user may select a color from color selection box 630 to correspond to the selected category. The user may additionally select Bold font selection box 620 to cause names in the selected category to be displayed in Bold font.

In some embodiments, the user may reload the color settings. Changes made to the options in editor selection display 600 may not be reflected instantly in a program already opened in the code editor. In some embodiments, the user may apply the changes to the program code by either closing and re-opening the program in the code editor or by pressing the F4 keyboard button while code editor window 204 is selected.

In some embodiments, the color coding rules may be customized for multiple programs that are simultaneously opened in the code editor. For example, the user may open two programs in code editor window 204, each program represented by a separate tab. The user may define the color coding rules to color variable names in Green in one program and Red in the other program. A common variable name may be listed in the code of both programs. In this case, the common variable name may reflect the color coding rules of each opened program. Therefore, in this example, the common variable name would be listed in Green in the first program and Red in the second program.

The schematic flow chart diagrams of FIGS. 3 and 5 are generally set forth as logical flow chart diagrams. As such, the depicted order and labeled steps are indicative of one aspect of the disclosed methods. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

Those of skill would appreciate that the various illustrative logical blocks, modules, circuits, and algorithm steps described in connection with the disclosure herein may be implemented as electronic hardware, computer software stored on a computing device and executed by one or more processing devices, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

In some embodiments, the techniques or steps of a method described in connection with the aspects disclosed herein may be embodied directly in hardware, in software executed by a processor, or in a combination of the two. In some aspects of the disclosure, any software module, software layer, or thread described herein may comprise an engine comprising firmware or software and hardware configured to perform aspects of the described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

If implemented in firmware and/or software, the functions described above may be stored as one or more instructions or code on a computer-readable medium. Examples include non-transitory computer-readable media encoded with a data structure and computer-readable media encoded with a computer program. Computer-readable media, includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

While the aspects of the disclosure described herein have been described with reference to numerous specific details, one of ordinary skill in the art will recognize that the aspects of the disclosure can be embodied in other specific forms without departing from the spirit of the aspects of the disclosure. Thus, one of ordinary skill in the art would understand that the aspects described herein are not to be limited by the foregoing illustrative details, but rather are to be defined by the appended claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of analyzing code within an integrated development environment, comprising:
   receiving a plurality of field size rules for automatically calculating a field size for a code structure;
   receiving a plurality of element display rules for categorizing one or more elements in a code structure;
   receiving a selection of one or more program variables;
   analyzing the selection for completeness;
   completing an incomplete selection; and
   displaying results based on the field size rules and the element display rules.

2. The method of claim 1, further comprising:
   creating lookups for the one or more program variables; and
   calculating field size offsets for the one or more program variables.

3. The method of claim 2, further comprising:
   determining a redefinition of the one or more program variables;
   calculating a field size offset for the redefinition; and
   matching the field size offset for the redefinition with the one or more program variables.

4. The method of claim 2, further comprising;
   modifying the selection of one or more program variables; and
   refreshing a calculation of the field size offsets for the one or more program variables.

5. The method of claim 1, further comprising:
   analyzing the one or more elements;
   categorizing the one or more elements into one or more categories;
   creating a plurality of lists corresponding to the one or more categories; and
   assigning an element display rule for each of the plurality of lists.

6. The method of claim 5, where the element display rules are color coding rules.

7. The method of claim 5, where the element display rules are font coding rules.

8. The method of claim 5, further comprising;
   modifying an element display rule; and
   refreshing display results based on the modified element display rule.

9. A computer program product, comprising:
   a non-transitory computer-readable medium comprising code to perform the steps of:
   receiving a plurality of field size rules for automatically calculating a field size for a code structure;
   receiving a plurality of element display rules for categorizing one or more elements in a code structure;
   receiving a selection of one or more program variables;
   analyzing the selection for completeness;
   completing an incomplete selection; and
   displaying results based on the field size rules and the element display rules.

10. The computer program product of claim 9, the steps further comprising:
    creating lookups for the one or more program variables; and
    calculating field size offsets for the one or more program variables.

11. The computer program product of claim 10, the steps further comprising:
    determining a redefinition of the one or more program variables;
    calculating a field size offset for the redefinition; and
    matching the field size offset for the redefinition with the one or more program variables.

12. The computer program product of claim 10, the steps further comprising;
    modifying the selection of one or more program variables; and
    refreshing a calculation of the field size offsets for the one or more program variables.

13. The computer program product of claim 9, the steps further comprising:
    analyzing the one or more elements;
    categorizing the one or more elements into one or more categories;
    creating a plurality of lists corresponding to the one or more categories; and
    assigning an element display rule for each of the plurality of lists.

14. The computer program product of claim 13, where the element display rules are color coding rules.

15. The computer program product of claim 13, where the element display rules are font coding rules.

16. The computer program product of claim 13, the steps further comprising;
    modifying an element display rule; and
    refreshing display results based on the modified element display rule.

17. An apparatus, comprising:
    a network interface card (NIC);
    a memory; and
    a processor coupled to the memory and to the network interface card (NIC), the processor configured to execute the steps of:
    receiving a plurality of field size rules for automatically calculating a field size for a code structure;
    receiving a plurality of element display rules for categorizing one or more elements in a code structure;
    receiving a selection of one or more program variables;
    analyzing the selection for completeness:
    completing an incomplete selection; and
    displaying results based on the field size rules and the element display rules.

18. The apparatus of claim 17, the steps further comprising:
    creating lookups for the one or more program variables; and
    calculating field size offsets for the one or more program variables.

19. The apparatus of claim 18, the steps further comprising:
    determining a redefinition of the one or more program variables;
    calculating a field size offset for the redefinition; and
    matching the field size offset for the redefinition with the one or more program variables.

20. The apparatus of claim 18, the steps further comprising;
    modifying the selection of one or more program variables; and
    refreshing a calculation of the field size offsets for the one or more program variables.

21. The apparatus of claim 17, the steps further comprising:
- analyzing the one or more elements;
- categorizing the one or more elements into one or more categories;
- creating a plurality of lists corresponding to the one or more categories; and
- assigning an element display rule for each of the plurality of lists.

22. The apparatus of claim 21, where the element display rules are color coding rules.

23. The apparatus of claim 21, where the element display rules are font coding rules.

24. The apparatus of claim 21, the steps further comprising;
- modifying an element display rule; and
- refreshing display results based on the modified element display rule.

* * * * *